US012622496B2

(12) United States Patent
Walser et al.

(10) Patent No.: US 12,622,496 B2
(45) Date of Patent: May 12, 2026

(54) WEATHER PROTECTION COVER FOR A HORIZONTALLY ARRANGED DISPLAY UNIT OF A FIELD DEVICE OF PROCESS AND AUTOMATION TECHNOLOGY

(71) Applicant: Endress+Hauser SE+Co. KG, Maulburg (DE)

(72) Inventors: Philipp Walser, Eimeldingen (DE); Philipp Höre, Freiburg (DE); Jan Schleiferböck, Rümmingen (DE)

(73) Assignee: Endress+Hauser SE+Co. KG, Maulburg (DE)

( * ) Notice: Subject to any disclaimer, the term of this patent is extended or adjusted under 35 U.S.C. 154(b) by 367 days.

(21) Appl. No.: 18/189,385

(22) Filed: Mar. 24, 2023

(65) Prior Publication Data

US 2023/0301410 A1 Sep. 28, 2023

(30) Foreign Application Priority Data

Mar. 24, 2022 (DE) ...................... 10 2022 107 036.0

(51) Int. Cl.
*A45C 13/00* (2006.01)
*G02B 5/08* (2006.01)

(52) U.S. Cl.
CPC .............. *A45C 13/002* (2013.01); *G02B 5/08* (2013.01)

(58) Field of Classification Search
CPC .... A45C 13/002; G02B 5/08; G02B 27/0006; G02B 5/10
See application file for complete search history.

(56) References Cited

U.S. PATENT DOCUMENTS 6,712,086 B1 * 3/2004 Fails ........................ E03B 7/072
137/364
2021/0356309 A1 * 11/2021 Huddleston ........... F16K 27/067
2023/0223975 A1 * 7/2023 Higuera .............. H04M 1/0214
455/575.8

FOREIGN PATENT DOCUMENTS

DE      102004009735 A1    9/2005
DE      102008047422 A1    4/2010
DE      102017114555 A1    1/2019
WO      WO-2004091271 A1 * 10/2004  ............... H01Q 1/42

* cited by examiner

*Primary Examiner* — Shadan E Haghani
(74) *Attorney, Agent, or Firm* — Kelly J. Smith; Endress+Hauser (USA) Holding, Inc.

(57) ABSTRACT

The present disclosure relates to a weather protection cover for a horizontally arranged display unit of a field device of process and automation technology. The weather protection cover includes a protective unit, which is arrangeable in such a manner that at least a first section of the protective unit lies opposite the display unit and at least the first section protects the display unit against weather influences. The weather protection cover includes at least one reflecting component, which is arranged and embodied in such a manner that the reflecting component reflects a display of the display unit, such that the display is observable perpendicularly to the display unit.

8 Claims, 3 Drawing Sheets

WEATHER PROTECTION COVER FOR A HORIZONTALLY ARRANGED DISPLAY UNIT OF A FIELD DEVICE OF PROCESS AND AUTOMATION TECHNOLOGY

CROSS-REFERENCE TO RELATED APPLICATION

The present application is related to and claims the priority benefit of German Patent Application No. 10 2022 107 036.0, filed on Mar. 24, 2022, the entire contents of which are incorporated herein by reference.

TECHNICAL FIELD

The present disclosure relates to a weather protection cover for a horizontally arranged display unit of a field device of process and automation technology as well as to a field device of process and automation technology.

BACKGROUND

In automation technology, such as in process automation technology, field devices are often applied, which serve for registering and/or influencing process variables. Serving for registering process variables are sensors, such as, for example, fill level measuring devices, flow measuring devices, pressure- and temperature measuring devices, pH- and redox potential measuring devices, conductivity measuring devices, etc., which register the corresponding process variables, fill level, flow, pressure, temperature, pH value, and conductivity. Serving for influencing process variables are actuators, such as, for example, valves or pumps, via which the flow of a liquid in a pipeline section, or the fill level in a container, can be changed. Referred to as field devices are all devices, which are applied near to a process and which deliver, or process, process relevant information. In connection with the present disclosure, the terminology, field devices, thus, refer also to remote I/Os, power supplies, radio adapters, and, in general, devices, which are arranged at the field level.

A field device typically includes a sensor, coming, at least partially, and/or at least at times, in contact with the process, and electronic components, which serve, for example, for signal registration, signal evaluation and/or signal feeding. The electronics of the field device is typically arranged in a housing and has supplementally at least one connecting element for connecting of the electronics to the sensor and/or to an external unit. The connecting element can be any kind of connection. For instance, a wireless connection can be used. The electronics and the sensor of the field device can be embodied as separate units with separate housings or as a shared unit having one housing.

Frequently, the field device supplementally includes a display unit, which serves for display of information concerning field device, such as, for example, parameters and/or device status. The display unit can be, for example, a display or a screen. As a rule, settings or calibrations of the field device can be made using the display unit or at least displayed using the display unit, while the settings are then made, for example, using an operating tool.

In the case of some field devices, the display unit is, as default, so oriented that the display unit is according to application of the field device horizontally oriented at a measuring point provided for the field device, such that a display on the display unit can only be read from a position above the display unit. For protecting the display unit and the housing of the field device, as a rule, a weather protection cover is provided, which is located above the field device. In the case of a horizontally arranged display unit, the weather protection cover, thus, hides the display unit and, so, gets in the way of the reading of the display.

SUMMARY

An object of the present disclosure is, consequently, a weather protection cover and a field device, in the case of which a horizontally arranged display unit is readable.

As regards the weather protection cover, the object is achieved according to the present disclosure by a weather protection cover for a horizontally arranged display unit of a field device of process and automation technology. The weather protection cover includes a protective unit, which is arrangeable in such a manner that at least a first section of the protective unit lies opposite the display unit and at least the first section protects the display unit against weather influences. The weather protection cover includes at least one reflecting component, which is arranged and embodied in such a manner that the at least one reflecting component reflects a display of the display unit, such that the display is observable perpendicularly to the display unit.

The weather protection cover protects the display unit against weather influences, such as rain, thunderstorms, hail and/or solar radiation and enables a reading of the display with the help of the at least one reflecting component. The display is reflected by using the at least one reflecting component from a horizontal plane into a vertical plane, such that the display is observable perpendicularly to the display unit by an observer. The observer can place itself in the horizontal plane alongside the display unit and observe, or read, the display with the help of the redirection brought about by the at least one reflecting component. The display can comprise words, a graphical presentation and/or a color. For example, a warning, a device status or some other uniquely associable information can be output for a user by using a color or a graphical presentation on the display unit. Furthermore, information concerning the field device, such as, for example, parameter and calibration data, can be displayed on the display.

In an embodiment, the at least one reflecting component includes one planar mirror or two planar mirrors.

Alternatively, the at least one reflecting component is a 3D-mirror, wherein the 3D-mirror is a 3D-body having a reflecting exterior and resulting from rotation of a 2D-area about an axis.

The 3D mirror may be a hyperboloid or a double cone or a double cone frustum.

In an additional embodiment, the planar mirror is arranged in the first section of the protective unit.

In an alternative embodiment, the two planar mirrors are arranged facing one another in a second section of the protective unit, in such a manner that the display is observable perpendicularly to the display unit using the two planar mirrors.

In an alternative embodiment, a first end region of the 3D-mirror is arranged in a region of the display unit and a second end region of the 3D-mirror opposite the first end region is arranged in the first section of the protective unit, wherein the display unit is embodied to display the display in a circle extending around the 3D-mirror, in such a manner that the display is observable perpendicularly to the display unit using the 3D-mirror. The display is embodied as a circle extending around the 3D-mirror. In this way, words of the display are observable using the 3D-mirror perpendicularly to the display unit as continuous text.

In an additional embodiment, the weather protection cover is rotatable about a longitudinal axis of the display unit, wherein the weather protection cover and/or the display unit are embodied in such a manner that a position of the weather protection cover relative to the display unit is determinable, wherein the display unit is embodied to adapt the display, depending on position of the weather protection cover, in such a manner that the display is observable with the help of the at least one reflecting component perpendicularly to the display unit. By rotating the weather protection cover about an axis of the display unit while keeping orientation of the display constant, also the image of the display is reflected by the at least one reflecting component rotates into the vertical plane. Depending on rotation of the weather protection cover, the display is observable perpendicular to the display unit or not. Accordingly, it may be advantageous to adapt the display, depending on position of the weather protection cover, so that the display is always observable perpendicularly to the display unit using the at least one reflecting component.

Advantageously, the display unit is embodied to show a mirror image as the display and/or to rotate the display. The showing of a mirror image as the display and/or the rotation of the display occurs, for example, as a function of the embodiment of the at least one reflecting component and/or a position of the weather protection cover.

In an additional embodiment, the weather protection cover and the display unit include a first reference unit and a second reference unit, wherein the first reference unit is embodied to transmit a signal, wherein the second reference unit is embodied to detect the signal of the first reference unit, wherein based on the signal detected by the second reference unit a position of the weather protection cover relative to the display unit is determinable.

The first reference unit and the second reference unit may be embodied to transmit and to detect an optical and/or a magnetic signal.

In an embodiment, the weather protection cover is connectable with the display unit and/or the field device and/or a container, on which the field device is arranged.

As regards the field device of process and automation technology, furthermore, the object of the present disclosure is achieved by a field device having a horizontally arranged display unit and a weather protection cover according to at least one of the preceding embodiments.

BRIEF DESCRIPTION OF THE DRAWINGS

The present disclosure will now be explained in greater detail based on the appended drawing, the figures of which show as follows.

DETAILED DESCRIPTION

The weather protection cover of the present disclosure is usable for all types of field devices having a horizontally arranged display unit.

Figure 1:
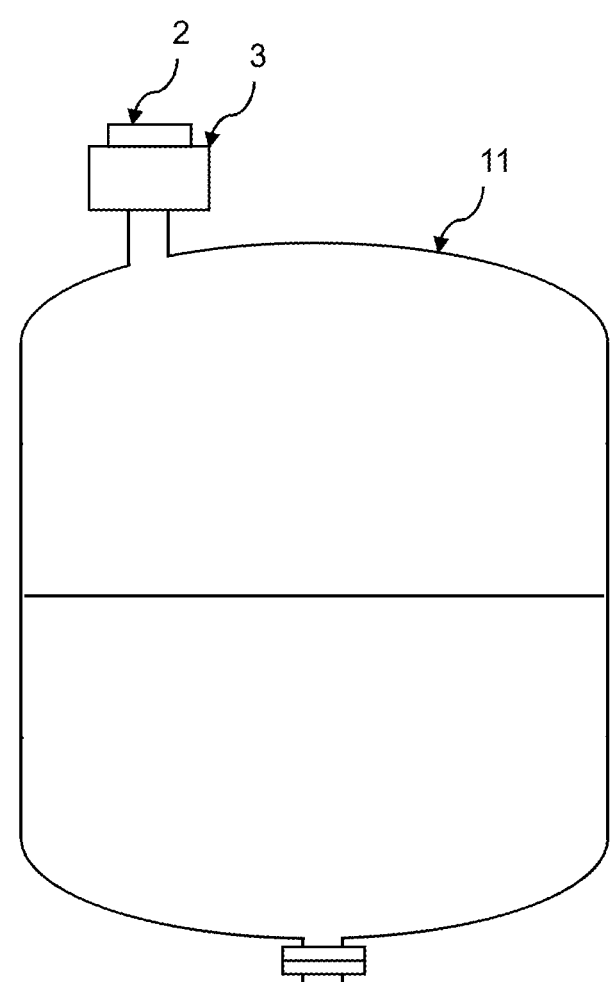
FIG. 1 shows a schematic view of a field device having a horizontally arranged display unit.

FIG. 1 shows a schematic view of a field device 3 having a horizontally arranged display unit 2 and mounted at a measuring point of a container 11. Container 11 in this example is a tank. The present disclosure can, however, also be applied at a tube or any other kind of measuring point. Display unit 2 is horizontally arranged, such that a display 6 on the display unit 2 is only readable, or observable, from a position above the display unit 2. Because of the horizontal orientation of the display unit 2, such is exposed unprotected to weather- and environmental influences, such that a weather protection cover 1 of the present disclosure (not shown in FIG. 1) is arranged on and connectable to the display unit 2, the field device 3 and/or the container 11. Display unit 2 is, for example, a display or a screen.

Figure 2:
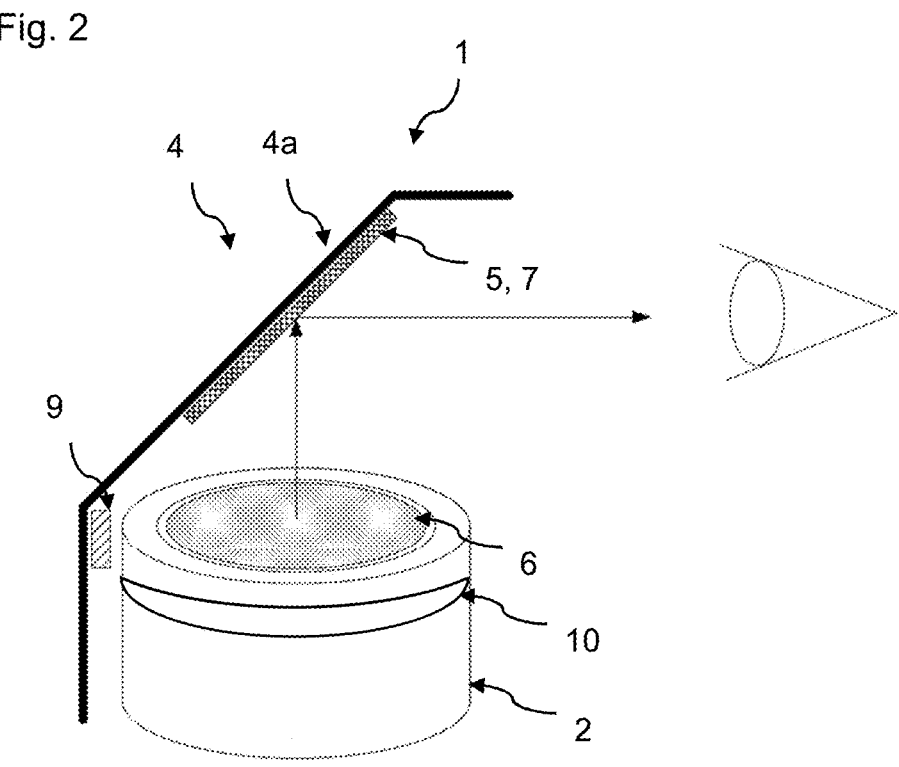
FIG. 2 shows a first embodiment of the weather protection cover of the present disclosure.

FIG. 2 shows a first embodiment of the weather protection cover 1 of the present disclosure. Weather protection cover 1 includes a protective unit 4, which is arrangeable in such a manner that at least a first section 4a of the protective unit 4 lies opposite the display unit 2 and at least the first section 4a protects the display unit 2 against weather influences. Moreover, the weather protection cover 1 includes at least one reflecting component 5, which is arranged and embodied in such a manner that the at least one reflecting component 5 reflects a display 6 of the display unit 2, such that display 6 is observable perpendicularly to the display unit 2. Thus, the image of the display 6 is brought using the at least one reflecting component 5 from a horizontal plane into a vertical plane.

In the first embodiment displayed in FIG. 2, the at least one reflecting component 5 is a planar mirror 7, which is arranged in the first section 4a of the protective unit 4. The arrows in FIG. 2 show, by way of example, the reflection of the display 6 by using the planar mirror 7 starting from the display 6 and extending into the eye of an observer. If only a single mirror 6 is used for reflecting the display unit 2, the display 6 must, as a rule, be displayed mirror inverted, i.e., backwards, on the display unit 2, in order that the display 6 is observable perpendicularly to the display unit 2 correctly in the planar mirror 7. Therefore, the display unit 2 can be embodied to show a mirror image as the display 6 and/or to rotate the display 6, such that the display 6 is observable perpendicularly to the display unit 2 using the at least one reflecting component 5. If the display 6 is only a color signal providing, for example, a status of the field device, then rotation and/or mirroring of the display 6 can, as a rule, be omitted. If, in contrast, a display 6 in the form of a text is displayed on the display unit 2, then, after the reflecting using the planar mirror 7, such is observable, or readable, on the display unit 2 perpendicularly to the display unit 2 only with an appropriate rotation and/or mirroring of the text.

Weather protection cover 1 can, moreover, be rotatable about a longitudinal axis of the display unit 2. This enables a matching of the orientation of the weather protection cover 1 to the conditions of the measuring point, the weather and/or the position of an observer. In such case, the weather protection cover 1 and/or the display unit 2 are embodied such that a position of the weather protection cover 1 relative to the display unit 2 is determinable. Depending on position of the weather protection cover 1, the display unit 2 can be embodied to adapt the display 6 in such a manner that the display 6 is observable with the help of the at least one reflecting component 5 perpendicularly to the display unit 2.

In order to determine the position of the weather protection cover 1 relative to the display unit 2, the weather protection cover 1 can be equipped with a first reference unit 9 and the display unit 2 with a second reference unit 10, or vice versa. The first reference unit 9 is embodied to transmit a signal, and the second reference unit 10 is embodied to detect the signal from the first reference unit 9. The first reference unit 9 and the second reference unit 10 are embodied to transmit and to detect an optical and/or a magnetic signal. For example, the first reference unit 9 is an optical transmitting unit, such as an LED, or it is a magnet. The second reference unit 10 can, accordingly, be, for example, a photodetector or a magnetic sensor, such as, among others, a Hall sensor. The first reference unit 9 and/or second reference unit 10 can be composed of one or more components. FIG. 2 shows the second reference unit 10 in the form of a band surrounding the display unit 2 and containing, for example, a series of photodetectors or magnetic sensors. The position of the weather protection cover 1 relative to the display unit 2 is determined by noting which photodetector is struck by the optical signal of the optical transmitting unit or which magnetic sensor detects the magnet of the first reference unit 9.

Figure 3:
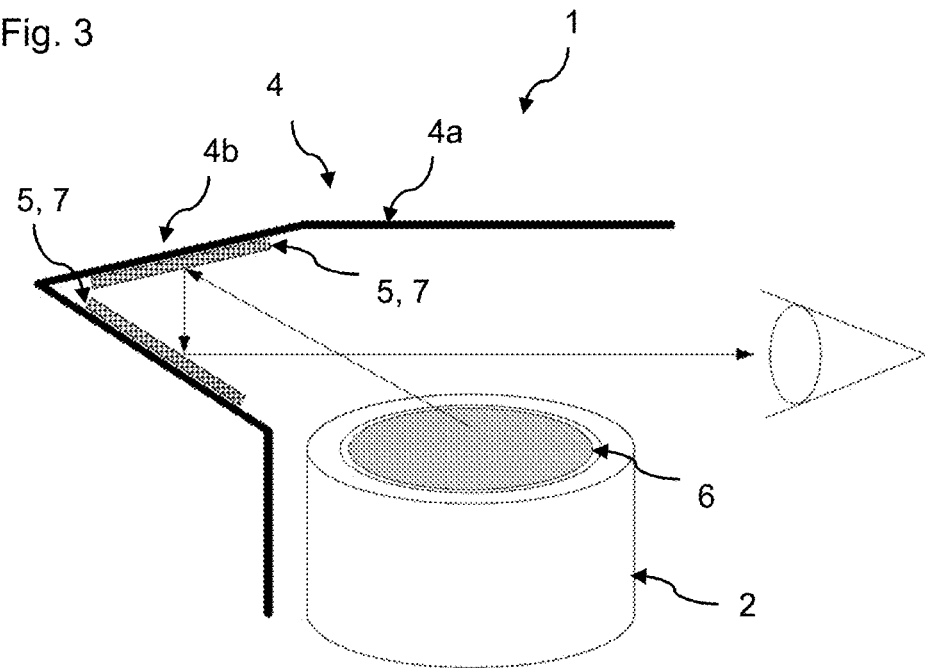
FIG. 3 shows a second embodiment of the weather protection cover of the present disclosure.

A second embodiment of the weather protection cover 1 of the present disclosure is shown in FIG. 3. In such case, the at least one reflecting component 5 is composed of two planar mirrors 7. The two planar mirrors 7 are arranged facing one another in a second section 4b of the protective unit 4, such that the display 6 is observable perpendicularly to the display unit 2 using the two planar mirrors 7. The arrows show the reflected path of the display 6 into the eye of the observer. By double reflection of the display 6 using the two planar mirrors 7, a mirroring in the display 6 of the display unit 2 is not necessary, since the display 6 in the case of sequential reflection by two planar mirrors 7 is then displayed correctly to an observer. It can, however, be necessary to rotate the display 6, depending on position of the weather protection cover 1 relative to the display unit 2. Possible embodiments have already been described in the first embodiment of the weather protection cover 1 of the present disclosure and apply in analogous manner for the second and additional embodiments.

Figure 4:
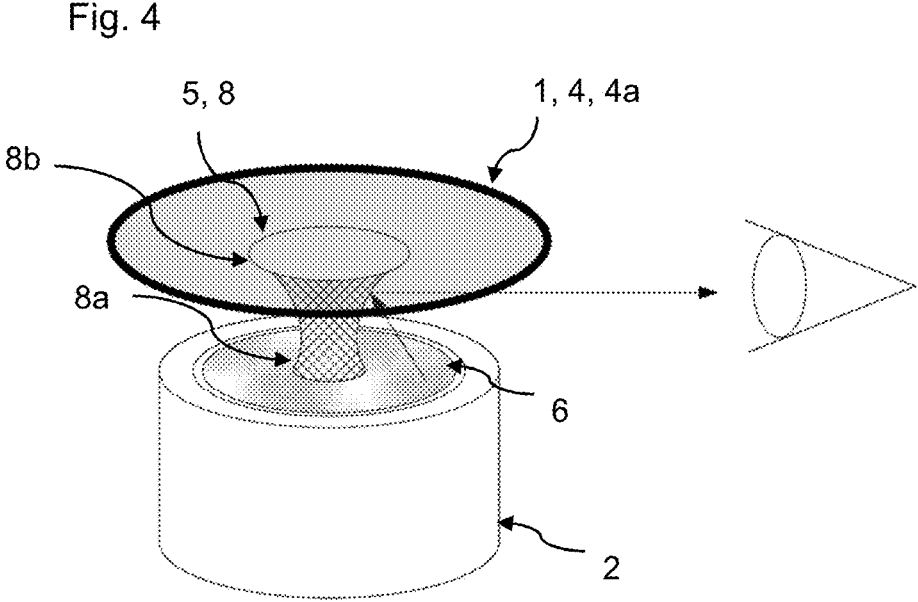
FIG. 4 shows a third embodiment of the weather protection cover of the present disclosure.

FIG. 4 shows a third embodiment of the weather protection cover 1 of the present disclosure, in the case of which the at least one reflecting component 5 is a 3D-mirror 8. A 3D-mirror 8 of this embodiment is a 3D-body having a reflecting exterior and resulting from rotation of a 2D-area about an axis. The 2D-area can be, for example, the area within a section of a curve, for example, a hyperbola. The 3D-mirror 8 can have the form of a hyperboloid, a double cone or a double cone frustum, thus, a body assembled from two conical frusta.

A first end region 8a of the 3D-mirror is arranged, in such case, in a region of the display unit 2 and a second end region 8b opposite the first end region 8a is arranged in the first section 4a of the protective unit 4. The protective unit 4 can include other sections or only have the first section 4a, such as shown in FIG. 4. The display 6 must, in such case, be adapted to the embodiment of the 3D-mirror 8. The display unit 2 may embodied to display the display 6 in a circle surrounding the 3D-mirror 8, in such a manner that the display 6 is observable perpendicularly to the display unit 2 using the 3D-mirror 8. By placing the display 6 in the circle around the 3D-mirror 8, the display 6 appears to an observer as a continuous text. Since, such as indicated based on the arrows in FIG. 4, only one reflection of the display 6 occurs, also in this case, the display 6 on the display unit 2 must be displayed in mirror inverted form.

Figure 5:
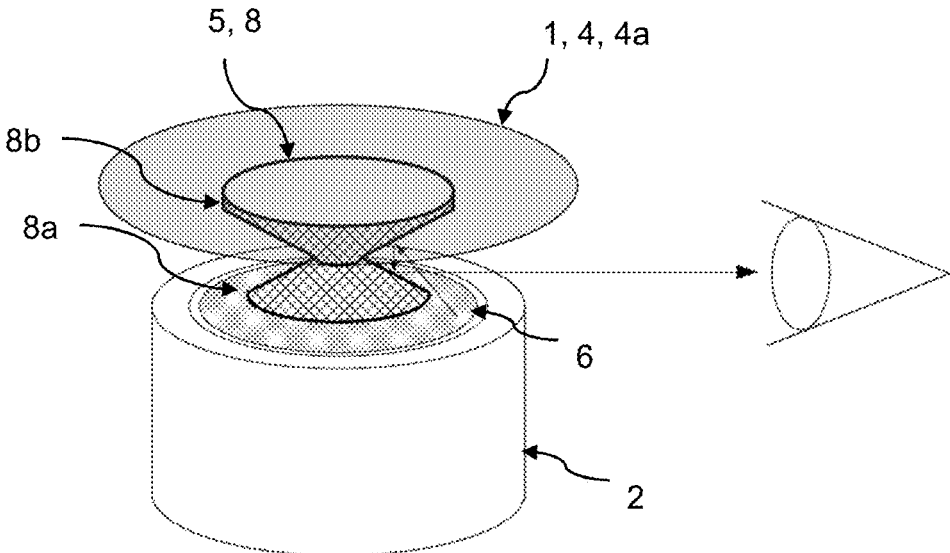
FIG. 5 shows a fourth embodiment of the weather protection cover of the present disclosure.

FIG. 5 shows a fourth embodiment of the weather protection cover 1 of the present disclosure, in the case of which likewise a 3D-mirror 8 is used as at least one reflecting component 5. In the case of the fourth embodiment, the 3D-mirror is embodied in such a manner that the display 6 is reflected two times on the 3D-mirror, such as indicated by the arrows in FIG. 5. Analogously to the third embodiment, the display 6 is embodied in a circle. A supplemental mirroring in the display 6 of the display unit 2 is not necessary in this example.

The invention claimed is:

1. A weather protection cover for a horizontally arranged display unit of a field device of process and automation technology, including:

wherein the weather protection cover includes a protective unit, which is arrangeable in such a manner that at least a first section of the protective unit lies opposite the display unit and at least the first section protects the display unit against weather influences, and wherein the weather protection cover includes at least one reflecting component, which is arranged and embodied in such a manner that the at least one reflecting component reflects a display of the display unit, such that the display is observable perpendicularly to the display unit by a user; and wherein the weather protection cover is rotatable about a longitudinal axis of the display unit, wherein the weather protection cover and/or the display unit are embodied in such a manner that a position of the weather protection cover relative to the display unit is determinable, wherein the display unit is embodied to adapt the display, depending on position of the weather protection cover, in such a manner that the display is observable with the help of the at least one reflecting component perpendicularly to the display unit.

2. The weather protection cover as claimed in claim 1, wherein the at least one reflecting component includes one planar mirror or two planar mirrors.

3. The weather protection cover as claimed in claim 2, wherein the planar mirror is arranged in the first section of the protective unit.

4. The weather protection cover as claimed in claim 1, wherein the weather protection cover is rotatable about a longitudinal axis of the display unit, wherein the weather protection cover and/or the display unit are embodied in such a manner that a position of the weather protection cover relative to the display unit is determinable, wherein the display unit is embodied to adapt the display, depending on position of the weather protection cover, in such a manner that the display is observable with the help of the at least one reflecting component (5) perpendicularly to the display unit (2).

5. The weather protection cover as claimed in claim 1, wherein the display unit is embodied to show a mirror image as the display and/or to rotate the display.

6. A weather protection cover for a horizontally arranged display unit of a field device of process and automation technology, including:

wherein the weather protection cover includes a protective unit, which is arrangeable in such a manner that at least a first section of the protective unit lies opposite the display unit and at least the first section protects the display unit against weather influences, and wherein the weather protection cover includes at least one reflecting component, which is arranged and embodied in such a manner that the at least one reflecting component reflects a display of the display unit, such that the display is observable perpendicularly to the display unit by a user; and wherein the weather protection cover and the display unit include a first reference unit and a second reference unit, wherein the first reference unit is embodied to transmit a signal, wherein the second reference unit is embodied to detect the signal of the first reference unit, wherein based on the signal detected by the second reference unit a position of the weather protection cover relative to the display unit is determinable.

7. The weather protection cover as claimed in claim 6, wherein the first reference unit and the second reference unit are embodied to transmit and to detect an optical and/or a magnetic signal.

8. The weather protection cover as claimed in claim 1, wherein the weather protection cover is connectable with the display unit and/or the field device and/or a container on which the field device is arranged.

* * * * *